(12) United States Patent
Liu et al.

(10) Patent No.: US 9,082,423 B1
(45) Date of Patent: Jul. 14, 2015

(54) MAGNETIC RECORDING WRITE TRANSDUCER HAVING AN IMPROVED TRAILING SURFACE PROFILE

(71) Applicant: Western Digital (Fremont), LLC, Fremont, CA (US)

(72) Inventors: Feng Liu, San Ramon, CA (US); Zhigang Bai, Fremont, CA (US); Weimin Si, San Ramon, CA (US); Yugang Wang, Milpitas, CA (US); Fenglin Liu, Milpitas, CA (US); Tao Pan, San Jose, CA (US); Samuel W. Yuan, Saratoga, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/223,957

(22) Filed: Mar. 24, 2014

Related U.S. Application Data

(60) Provisional application No. 61/917,757, filed on Dec. 18, 2013.

(51) Int. Cl.
*G11B 5/11* (2006.01)

(52) U.S. Cl.
CPC . *G11B 5/11* (2013.01); *G11B 5/112* (2013.01)

(58) Field of Classification Search
CPC ...... G11B 5/3116; G11B 5/3146; G11B 5/11; G11B 5/112
USPC ........................................ 360/125.03, 125.11
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |

(Continued)

*Primary Examiner* — Angel Castro

(57) ABSTRACT

A magnetic transducer has an ABS, a pole, coil(s) and a trailing shield. The pole includes a trailing surface having first and second portions. The first portion adjoins the ABS and is oriented at a first bevel angle from perpendicular to the ABS. The first bevel angle is nonzero and acute. The second portion adjoins the first portion, is recessed from the ABS and oriented at a second bevel angle from perpendicular to the ABS. The second bevel angle is less than the first bevel angle and nonzero. The trailing shield has a pole-facing surface part of which adjoins the ABS and is oriented at the first bevel angle. A write gap is between the trailing shield and the pole. The write gap has a constant thickness for the first portion of the trailing surface and a thickness that increases with increasing distance from the ABS for the second portion.

21 Claims, 9 Drawing Sheets

(56) References Cited

U.S. PATENT DOCUMENTS

| | | |
|---|---|---|
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,342,311 B1 | 1/2002 | Inturi et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,562,487 B1 | 5/2003 | Vas'ko et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |

(56) References Cited

U.S. PATENT DOCUMENTS

| | | |
|---|---|---|
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,070,698 B2 | 7/2006 | Le |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,973 B2 | 4/2007 | Lille |
| 7,199,974 B1 | 4/2007 | Alfoqaha |
| 7,199,975 B1 | 4/2007 | Pan |
| 7,211,339 B1 | 5/2007 | Seagle et al. |
| 7,212,379 B2 | 5/2007 | Hsu et al. |
| 7,212,380 B2 | 5/2007 | Hsiao et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,271,982 B2 | 9/2007 | MacDonald et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,337 B2 | 11/2007 | McFadyen |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,322,095 B2 | 1/2008 | Guan et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,343,667 B2 | 3/2008 | Lille |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,377,024 B2 | 5/2008 | Chen |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,824 B2 | 8/2008 | Kameda |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |

(56) References Cited

U.S. PATENT DOCUMENTS

| | | |
|---|---|---|
| 7,436,638 B1 | 10/2008 | Pan |
| 7,440,220 B1 | 10/2008 | Kang et al. |
| 7,440,230 B2 | 10/2008 | Hsu et al. |
| 7,443,632 B1 | 10/2008 | Stoev et al. |
| 7,444,740 B1 | 11/2008 | Chung et al. |
| 7,446,980 B2 | 11/2008 | Le |
| 7,468,862 B2 | 12/2008 | Sasaki et al. |
| 7,493,688 B1 | 2/2009 | Wang et al. |
| 7,506,431 B2 | 3/2009 | Hsiao et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,532,432 B2 | 5/2009 | Ikeda et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,558,019 B2 | 7/2009 | Le et al. |
| 7,562,437 B2 | 7/2009 | Pentek et al. |
| 7,576,951 B2 | 8/2009 | Allen et al. |
| 7,583,466 B2 | 9/2009 | Kermiche et al. |
| 7,595,967 B1 | 9/2009 | Moon et al. |
| 7,633,713 B2 | 12/2009 | Chen et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,712,206 B2 | 5/2010 | Jiang et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,748,104 B2 | 7/2010 | Bonhote et al. |
| 7,757,380 B2 | 7/2010 | Baer et al. |
| 7,768,743 B2 | 8/2010 | Guthrie et al. |
| 7,770,281 B2 | 8/2010 | Pentek |
| 7,777,988 B2 | 8/2010 | Guan et al. |
| 7,785,666 B1 | 8/2010 | Sun et al. |
| 7,788,797 B2 | 9/2010 | Kim et al. |
| 7,793,406 B2 | 9/2010 | Zheng |
| 7,796,356 B1 | 9/2010 | Fowler et al. |
| 7,800,858 B1 | 9/2010 | Bajikar et al. |
| 7,804,666 B2 | 9/2010 | Guan et al. |
| 7,819,979 B1 | 10/2010 | Chen et al. |
| 7,821,736 B2 | 10/2010 | Che et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,894,159 B2 | 2/2011 | Lengsfield, III et al. |
| 7,898,766 B2 | 3/2011 | Guan et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,920,358 B2 | 4/2011 | Jiang et al. |
| 7,924,528 B2 * | 4/2011 | Sasaki et al. ............ 360/125.15 |
| 7,968,219 B1 | 6/2011 | Jiang et al. |
| 7,969,684 B2 | 6/2011 | Le et al. |
| 7,982,989 B1 | 7/2011 | Shi et al. |
| 7,995,307 B2 | 8/2011 | Zheng |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,018,679 B2 | 9/2011 | Hsiao et al. |
| 8,024,748 B1 | 9/2011 | Moravec et al. |
| 8,031,433 B2 | 10/2011 | Yan et al. |
| 8,036,069 B1 | 10/2011 | Jin et al. |
| 8,051,552 B2 | 11/2011 | Jiang et al. |
| 8,066,892 B2 | 11/2011 | Guthrie et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,111,479 B2 | 2/2012 | Chen et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,201,320 B2 | 6/2012 | Allen et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,233 B1 * | 7/2012 | Shen et al. ............ 360/125.03 |
| 8,233,235 B2 | 7/2012 | Chen et al. |
| 8,233,248 B1 | 7/2012 | Li et al. |
| 8,238,056 B2 | 8/2012 | Guan et al. |
| 8,248,728 B2 | 8/2012 | Yamaguchi et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,792 B2 | 9/2012 | Bai et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,295,132 B2 | 10/2012 | Jin et al. |
| 8,300,358 B2 | 10/2012 | Maruyama et al. |
| 8,307,539 B1 | 11/2012 | Rudy et al. |

(56) References Cited

U.S. PATENT DOCUMENTS

| | | |
|---|---|---|
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,323,727 B2 | 12/2012 | Pentek et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,339,749 B2 | 12/2012 | Mochizuki et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,345,383 B2 | 1/2013 | Yan et al. |
| 8,347,488 B2 | 1/2013 | Hong et al. |
| 8,349,195 B1 | 1/2013 | Si et al. |
| 8,351,307 B1 | 1/2013 | Wolf et al. |
| 8,355,222 B2 | 1/2013 | Mino et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,470,186 B2 | 6/2013 | Chen et al. |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,234 B2 * | 11/2013 | Linville et al. ........... 360/125.02 |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |

(56) References Cited

U.S. PATENT DOCUMENTS

| | | |
|---|---|---|
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2002/0034043 A1 | 3/2002 | Okada et al. |
| 2005/0219747 A1 | 10/2005 | Hsu et al. |
| 2006/0268456 A1 | 11/2006 | Sasaki et al. |
| 2007/0230046 A1 | 10/2007 | Le et al. |
| 2007/0236831 A1 | 10/2007 | Che et al. |
| 2008/0002292 A1 | 1/2008 | Le et al. |
| 2008/0112082 A1 | 5/2008 | Guan et al. |
| 2008/0198507 A1 | 8/2008 | Maruyama et al. |
| 2008/0225441 A1 | 9/2008 | Yamada et al. |
| 2008/0259498 A1 | 10/2008 | Lengsfield et al. |
| 2008/0278861 A1 | 11/2008 | Jiang et al. |
| 2009/0002885 A1 | 1/2009 | Sin |
| 2009/0021863 A1 | 1/2009 | Zheng |
| 2009/0103211 A1 | 4/2009 | Chen et al. |
| 2009/0116145 A1 | 5/2009 | Guan et al. |
| 2009/0147410 A1 | 6/2009 | Jiang et al. |
| 2009/0154012 A1 | 6/2009 | Mochizuki et al. |
| 2009/0154019 A1 | 6/2009 | Hsiao et al. |
| 2009/0268344 A1 | 10/2009 | Guan et al. |
| 2010/0061016 A1 | 3/2010 | Han et al. |
| 2010/0165517 A1 | 7/2010 | Araki et al. |
| 2010/0172054 A1 | 7/2010 | Yamaguchi et al. |
| 2010/0277832 A1 | 11/2010 | Bai et al. |
| 2010/0290157 A1 | 11/2010 | Zhang et al. |
| 2011/0086240 A1 | 4/2011 | Xiang et al. |
| 2011/0134567 A1 | 6/2011 | Chen et al. |
| 2011/0134569 A1 | 6/2011 | Allen et al. |
| 2011/0151279 A1 | 6/2011 | Allen et al. |
| 2012/0026629 A1 | 2/2012 | Hirata et al. |
| 2012/0044598 A1 | 2/2012 | Bai et al. |
| 2012/0087042 A1 | 4/2012 | Zhou et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0314324 A1 | 12/2012 | Guan |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

\* cited by examiner

Prior Art
ABS View

MAGNETIC RECORDING WRITE TRANSDUCER HAVING AN IMPROVED TRAILING SURFACE PROFILE

CROSS-REFERENCE TO RELATED APPLICATIONS

This application claims priority to provisional U.S. Patent Application Ser. No. 61/917,757, filed on Dec. 18, 2013, which is hereby incorporated by reference in its entirety.

BACKGROUND

FIGS. 1A and 1B depict ABS and side views of a conventional magnetic recording transducer 10. The magnetic recording transducer 10 may be a perpendicular magnetic recording (PMR) transducer. The conventional magnetic recording transducer 10 may be a part of a merged head including the write transducer 10 and a read transducer (not shown). Alternatively, the magnetic recording head may be a write head including only the write transducer 10. The conventional write transducer 10 may also be used in shingle magnetic recording schemes, which may allow for a larger pole tip geometry.

The write transducer 10 includes an underlayer 12, a non-magnetic layer 14, a main pole 20 and a trailing shield 30. The underlayer 12 may include multiple structures which are under the pole 20. The transducer 10 may also include other components including but not limited to coils for energizing the main pole 20.

The main pole 20 resides on an underlayer 12 and includes sidewalls 22 and 24. The sidewalls 22 and 24 of the conventional main pole 20 form an angle $\phi 0$ with the down track direction at the ABS. The trailing surface (top) of the pole is wider than the leading surface (bottom) of the main pole. The top (trailing) surface of the main pole 20 also has a bevel angle $\phi 1$ with the stripe height direction. Thus, a write gap of constant width, d, is formed between the trailing shield 30 and the main pole 20.

Although the conventional magnetic recording transducer 10 functions, there are drawbacks. In particular, the conventional magnetic recording head 10 may not perform sufficiently at higher recording densities. For example, the write field of the conventional main pole 20 may be shunted by the trailing shield 30. Consequently, insufficient field for writing to the media (not shown in FIGS. 1A-1B) may be provided. Accordingly, what is needed is a system and method for improving the performance of a magnetic recording head.

DETAILED DESCRIPTION OF THE PREFERRED EMBODIMENTS

Figure 1A:
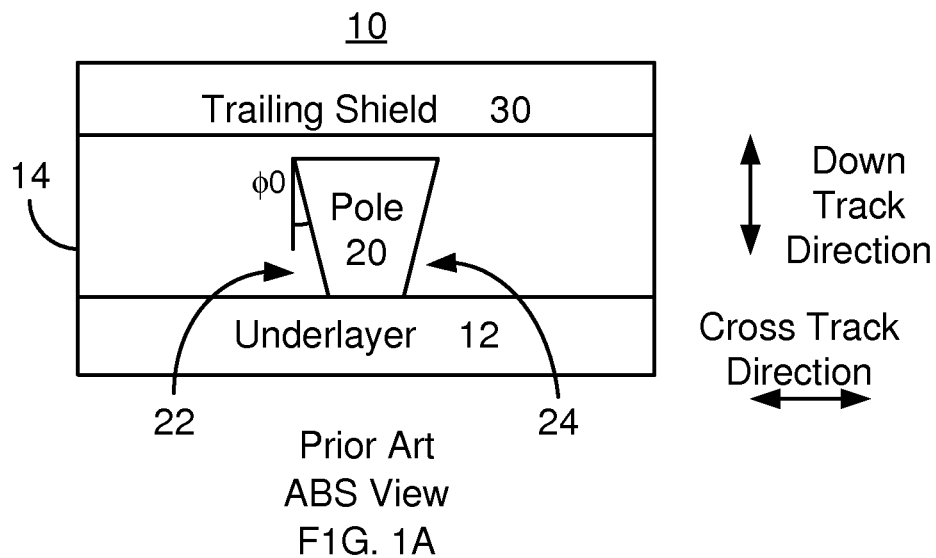
FIGS. 1A-1B depict ABS and side views of a conventional magnetic recording transducer.
Figure 1B:
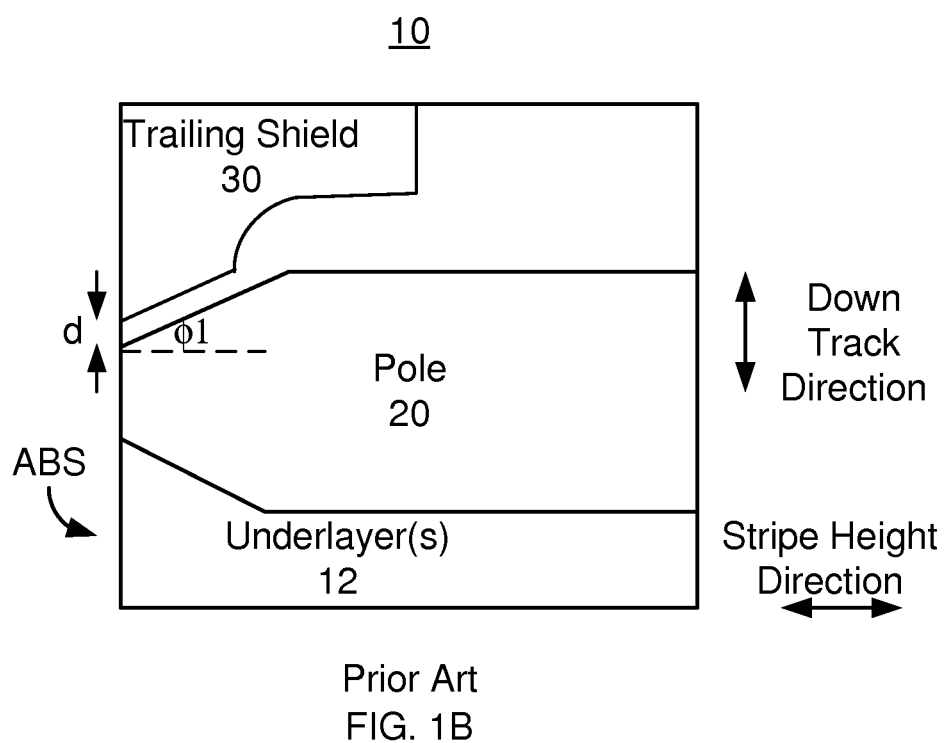
Figure 2A:
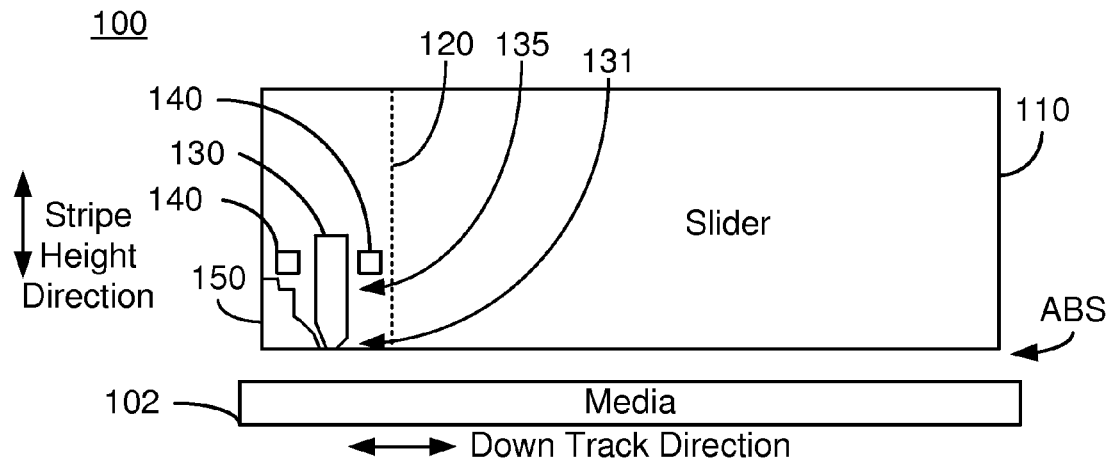
FIGS. 2A, 2B and 2C depict side, close-up side and ABS views of an exemplary embodiment of a magnetic recording disk drive.
Figure 2B:
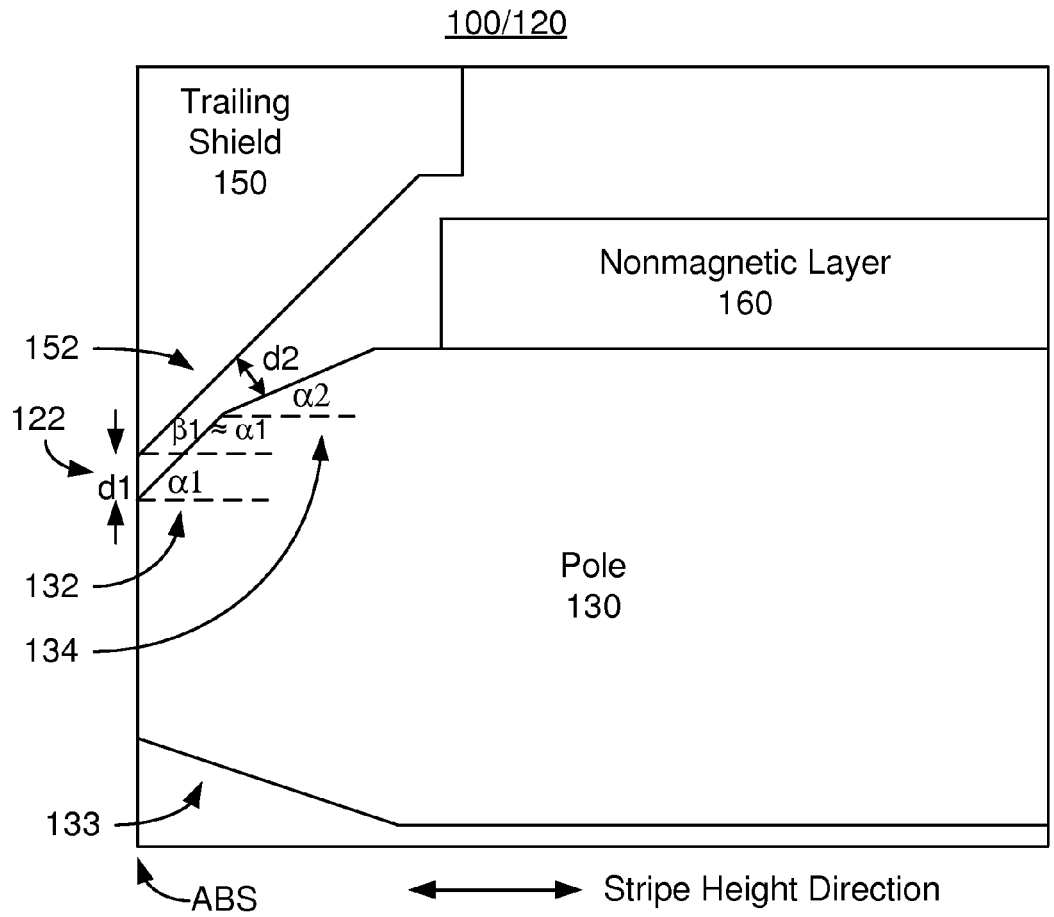
Figure 2C:
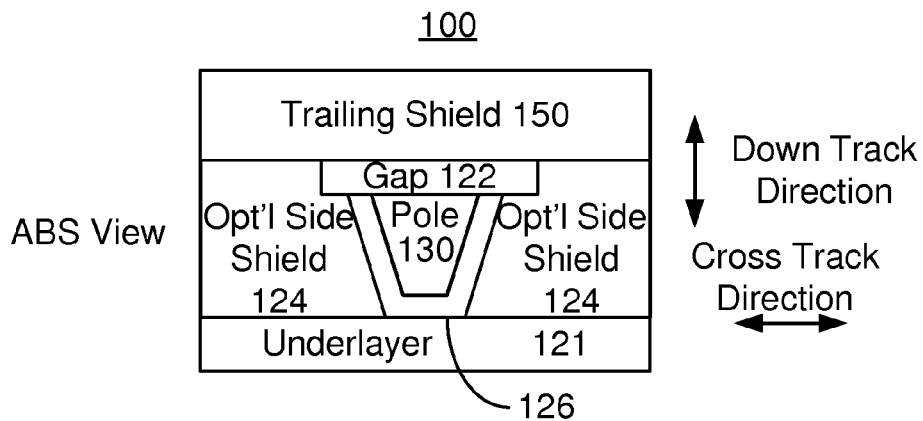

FIGS. 2A, 2B and 2C depicts side, close-up side and ABS views of an exemplary embodiment of a portion of a disk drive 100 including a write transducer 120. For clarity, FIGS. 2A, 2B and 2C are not to scale. For simplicity not all portions of the disk drive 100 and transducer 120 are shown. In addition, although the disk drive 100 and transducer 120 are depicted in the context of particular components other and/or different components may be used. For example, circuitry used to drive and control various portions of the disk drive 100 is not shown. For simplicity, only single components are shown. However, multiples of each components and/or and their sub-components, might be used. The disk drive 100 may be a PMR disk drive. However, in other embodiments, the disk drive 100 may be configured for other types of magnetic recording.

The disk drive 100 includes media 102, a slider 110 and a write transducer 120. Additional and/or different components may be included in the disk drive 100. The transducer 120 is fabricated on the slider 110 and includes an air-bearing surface (ABS) proximate to the media 102 during use. Although not shown, the slider 110 and thus the transducer 120 are generally attached to a suspension (not shown). In general, the disk drive 100 includes a write transducer 120 and a read transducer (not shown). However, for clarity, only the write transducer 120 is shown. The transducer 120 includes a main pole 130, coils 140 and trailing shield 150. The transducer may also include an underlayer 121, write gap 122, optional side shields 124, and side/bottom gap 126. The underlayer 121 may include a leading shield. The underlayer 121 may include multiple structures on which the main pole 130 is fabricated. At least part of the side/bottom gap 126 is non-magnetic and, in some embodiments, includes a seed layer for the main pole. As discussed above, portions of the components 121, 122, 124, 126, 130, 140 and 150 may include multiple layers. In other embodiments, different and/or additional components may be used in the write transducer 120.

The coil(s) 140 are used to energize the main pole 130. Two turns 140 are depicted in FIG. 2A. Another number of turns may, however, be used. Note that only a portion of the coil(s) 140 is shown in FIG. 2A. Additional turns and/or additional layers of coils may be used. If, for example, the coil(s) 140 form a spiral, or pancake, coil, then additional portions of the coil(s) 140 may be located further from the ABS. The coil(s) may also be a helical coil. Further, additional coils may also be used.

The main pole 130 includes a pole tip region 131 close to the ABS and a yoke region 135 recessed from the ABS. The pole tip region 131 includes sidewalls in the cross track direction. The sidewalls are configured such that the pole 130 has a bottom and a top wider than the bottom. The pole tip region 131 is shown as having bottom/leading surface 133 and a top/trailing surface. The trailing surface has two portions 132 and 134.

The trailing surface of the main pole 130 is opposite to the leading surface 133 and faces the trailing shield 150. The first portion 132 of the trailing surface is oriented at a first bevel angle, $\alpha 1$, from the stripe height direction (perpendicular to the ABS). This first portion 132 of the trailing surface also adjoins the ABS. The first bevel angle is an acute angle, as shown in FIG. 2B. Thus, the first bevel angle is greater than zero (and thus at a nonzero angle from the ABS) and less than ninety degrees (at a nonzero angle from the stripe height direction). In some embodiments, the first bevel angle is at least fifteen degrees and not more than forty degrees. In some such embodiments, the first bevel angle is at least twenty-five degrees and not more than thirty-three degrees. For example, the first bevel angle may be nominally thirty-three degrees. The first portion 132 of the trailing surface extends not more than one hundred fifty nanometers from the ABS. The second portion 134 thus commences not more than one hundred fifty nanometers from the ABS in such embodiments. In some embodiments, the first portion 132 of the trailing surface extends at least one forty nanometers and not more than eighty nanometers from the ABS. For example, the first portion 132 of the trailing surface may extend to nominally sixty nanometers from the ABS. However, other distances are possible.

The second portion 134 of the trailing surface of the main pole 130 is at a second bevel angle, $\alpha 2$, from the stripe height direction. The second portion 134 of the trailing surface is recessed from the ABS. In some embodiments, the second portion 134 of the trailing surface adjoins the first portion 132 of the trailing surface. The second bevel angle is an acute angle. Thus, the second bevel angle is greater than zero (and thus at a nonzero angle from the ABS) and less than ninety degrees (at a nonzero angle from the stripe height direction). Further, the second bevel angle is smaller than the first bevel angle ($\alpha 2 < \alpha 1$). In some embodiments, the second bevel angle is a least ten degrees and not more than thirty-five degrees. In some such embodiments, the second bevel angle is a least twenty degrees and not more than thirty degrees. For example, the second bevel angle may be nominally twenty-seven degrees. The second portion 134 of the trailing surface extends from the end of the first portion 132 to at least one hundred nanometers and not more than two hundred fifty nanometers from the ABS. In some such embodiments, the second portion 134 extends from the end of the first portion 132 to not more than one hundred fifty nanometers from the ABS. For example, the second portion 134 of the trailing surface may extend from nominally sixty nanometers from the ABS (the end of the first portion 132) to one hundred fifty nanometers from the ABS. However, other distances are possible.

The trailing shield 150 has a pole-facing surface which faces the trailing surface of the main pole 130. A first portion 152 of the pole-facing surface adjoins the ABS and is at a trailing shield angle, $\beta 1$, from the stripe height direction at the ABS. In the embodiment shown, the first portion 152 of pole-facing surface is substantially flat and occupies the entire pole-facing surface of the trailing shield 150. In the embodiment shown, the trailing shield angle is substantially the same as the first bevel angle ($\beta 1 \approx \alpha 1$). In some embodiments, the first portion 152 of pole-facing surface terminates not more than one hundred fifty nanometers from the ABS. For example, the first portion 152 of pole-facing surface may terminate nominally one hundred and five nanometers from the ABS. However, other distances are possible.

Between the pole-facing surface of the trailing shield 150 and trailing surface (132 and 134) of the main pole 130 is the write gap 122. Because the trailing shield angle is substantially the same as the first bevel angle, the write gap 122 thickness is substantially constant between the first portion 152 of pole-facing surface and the first portion 132 of the trailing surface. This thickness is shown in FIG. 2B as d1.

However, between the first portion 152 of pole-facing surface and the second portion 134 of the trailing surface, the distance (d2) between the pole 130 and the shield 150 changes. Thus, the write gap 122 has a varying thickness in this region. In some embodiments, the thickness of the write gap 122 increases with increasing distance from the ABS in the region between the pole-facing surface 152 and the second portion 134 of the trailing surface. In some embodiments, the write gap 122 has a thickness d1 of at least ten nanometers and not more than thirty-five nanometers. In some embodiments, the write gap 122 has a thickness d1 is at least eighteen nanometers and not more than thirty nanometers. In some such embodiments, the thickness d1 is nominally twenty-four nanometers at the ABS. However, other widths are possible. The width of the gap d2, however, varies. In some embodiments, d2 varies between at least thirteen nanometers and not more than forty nanometers. In some such embodiments, d2 is at least twenty-three nanometers and not more than thirty-two nanometers some distance from the throat height (location at which the first portion 132 of the trailing surface terminates).

The magnetic disk drive 100 may exhibit improved performance. Because the width d1 of the gap 122 is constant near the ABS, the field produced by the magnetic transducer 120 is relatively constant between different heads. Further, the magnitude of the field may be substantially maintained. The configuration of the main pole 130 and trailing shield 150 allow for reduced shunting of the field by the trailing shield 150. More specifically, the increase in the width of the write gap 122 between the second portion 134 of the trailing surface and the trailing shield 150 reduces the shunting of magnetic field by the trailing shield 150. Saturation of the trailing shield 150 may be reduced or avoided. As a result, performance of the transducer 120 may be improved. This improvement may be achieved without significant degradation of off track erasure performance. The magnetic transducer 120 may also be used in conventional perpendicular magnetic recording as well as shingle recording. Thus, performance of the disk drive 100 may be improved.

Figure 3:
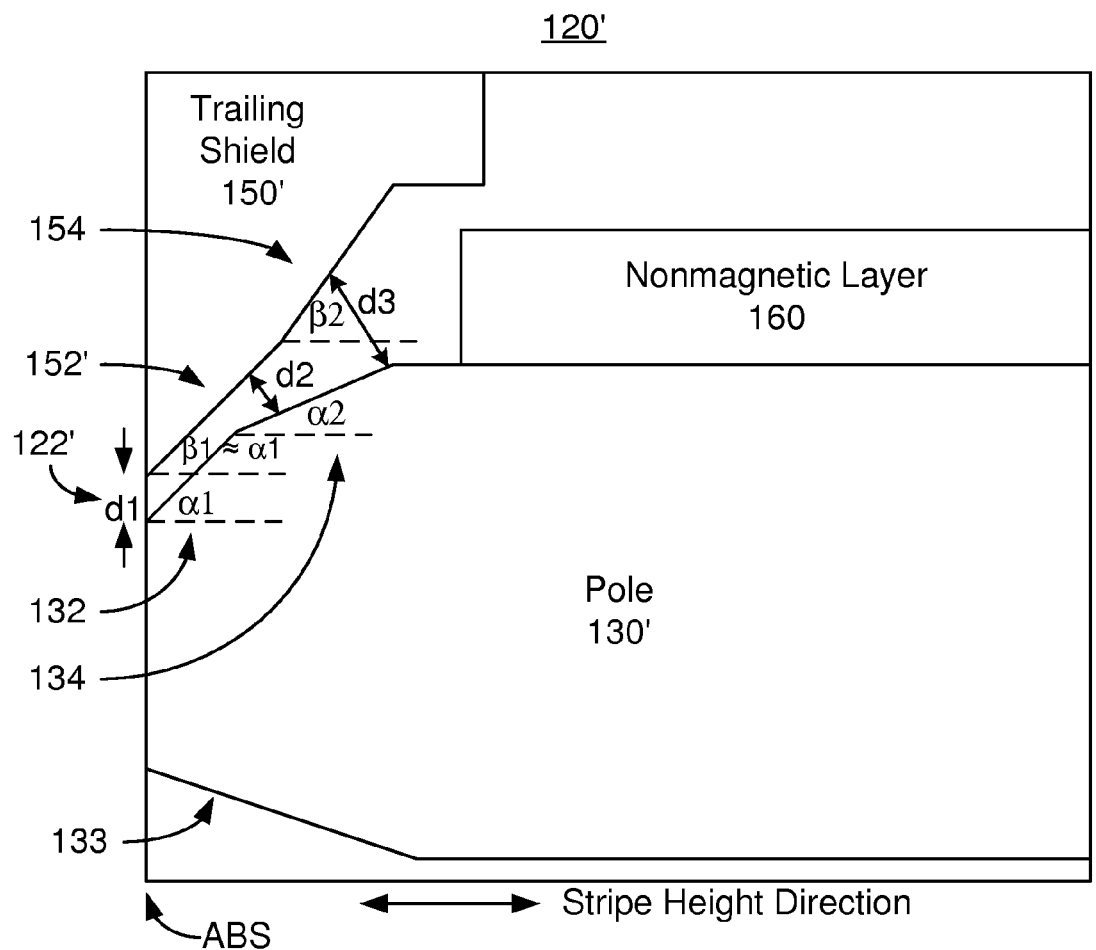
FIG. 3 depicts a side view of another exemplary embodiment of a magnetic recording transducer.

FIG. 3 depicts a side view of another exemplary embodiment of a magnetic recording transducer 120'. For clarity, FIG. 3 is not to scale. For simplicity not all portions of the transducer 120' are shown. The magnetic recording transducer 120' is analogous to the transducer 120 and may be used in the magnetic disk drive 100. Thus, analogous components have similar labels. Further, as the ABS view of the transducer 120' is analogous to that of the transducer 120, only a side view is shown.

The transducer 120' includes a main pole 130' having a beveled leading surface 133 and a trailing surface including first and second portions 132 and 134. Also shown in FIG. 3 are the trailing shield 150', the nonmagnetic layer 160 and the write gap 122'. The first portion 132 of the trailing surface is oriented at a first bevel angle, $\alpha 1$, from the stripe height direction. The first bevel angle and first portion 132 of the trailing surface are analogous to those described with respect to FIGS. 2A-2C. Similarly, the second portion 134 of the trailing surface is oriented at a second bevel angle, $\alpha 2$, from the stripe height direction. The bevel angles and portions 132 and 134 of the trailing surface may be configured as described above. For example, the second bevel angle is smaller than the first bevel angle ($\alpha 2 < \alpha 1$). The size of the bevel angles and extent to which the portions 132 and 134 of the trailing surface extend from the ABS may also be analogous to those described above.

The trailing shield 150' has a first portion 152' of pole-facing surface, which faces the trailing surface of the main pole 130' and is analogous to the first portion 152 of pole-facing surface. The first portion 152' of pole-facing surface is at a trailing shield angle, β1, from the stripe height direction at the ABS. The trailing shield angle is substantially the same as the first bevel angle (β1≈α1). In some embodiments, the first portion 152' of the pole-facing surface terminates at least twenty and not more than one hundred nanometers from the ABS. In some such embodiments, the first portion 152' of the pole facing surface terminates at least forty and not more than eighty nanometers from the ABS. For example, the first pole-facing surface 152' may terminate nominally seventy-five nanometers from the ABS. However, other distances are possible. Further, in the embodiment shown, the first portion 152' of the trailing shield's pole facing surface terminates a different distance from the ABS than the first portion 132 of the pole's trailing surface terminates. However, in other embodiments, these surfaces 152' and 132 may terminate the same distance from the ABS.

The trailing shield 150' also has a second portion 154 of the pole-facing surface that is recessed from the ABS. The second portion 154 of the pole-facing surface also adjoins the first portion 152' of pole-facing surface. This second portion 154 of the pole-facing surface is at a second trailing shield angle, β2, from the stripe height direction. The second trailing shield angle is larger than the first bevel angle and thus larger than the second bevel angle (α2<α1<β2). In some embodiments, the second trailing shield angle is at least twenty degrees and not more than fifty degrees. The second trailing shield angle may be at least thirty-five degrees and not more than forty-five degrees. The second portion 154 of the pole-facing surface extends from the end of the first portion 152' of the pole-facing surface to not more than one hundred fifty nanometers from the ABS. For example, the second portion 154 of pole-facing surface may terminate nominally one hundred and five nanometers from the ABS. However, other distances are possible.

Between pole facing surface (152' and 154) of the trailing shield 150' and the trailing surface (132 and 134) of the main pole 130' is the write gap 122'. Because the trailing shield angle is substantially the same as the first bevel angle, the write gap 122' thickness is substantially constant between the first portion 152' of the pole-facing surface of the trailing shield 150' and the first portion 132 of the trailing surface of the main pole 130'. This thickness is shown in FIG. 3 as d1 and is substantially the same as discussed above. Between the first portion 152' of the pole-facing surface and the second portion 134 of the trailing surface, the distance (d2) between the pole 130' and the shield 150' changes. The thickness of the write gap 122' increases with increasing distance from the ABS in the region between the first portion 152' of the pole-facing surface and the second portion 134 of the trailing surface. In some embodiments, d2 is at least twenty-five nanometers. Between the second portion 154 of the pole-facing surface and the second portion 134 of the trailing surface, the thickness (d3) of the write gap 122' increases more rapidly. This is because the pole 130' and trailing shield 150' diverge more quickly because of the second bevel angle β2. In some embodiments, d3 is at least twenty nanometers and not more than sixty nanometers. For example, d3 may be at least thirty five and not more than fifty nanometers. However, other widths are possible.

The magnetic transducer 120' may share the benefits of the transducer 120 and disk drive 100. Because the width d1 of the gap 122' is constant near the ABS, the field produced by the magnetic transducer 120' is relatively constant between different heads. Further, the magnitude of the field may be substantially maintained. The configuration of the main pole 130' and trailing shield 150' allow for reduced shunting of the field by the trailing shield 150'. As a result, performance of the transducer 120' may be improved without significant degradation of off track erasure performance. The magnetic transducer 120' may also be used in conventional perpendicular magnetic recording as well as shingle recording. Thus, performance of the disk drive 100 using the transducer 120' may be improved.

Figure 4:
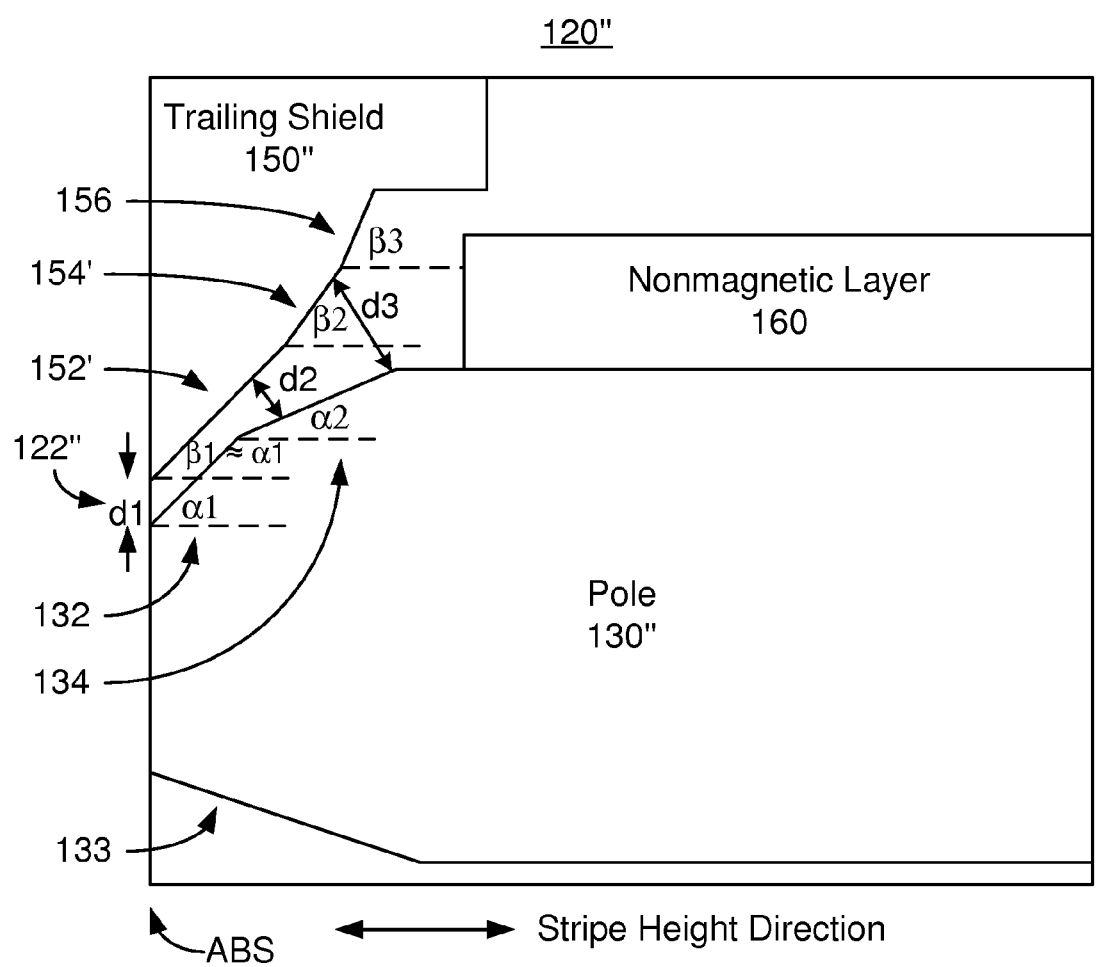
FIG. 4 depicts a side view of another exemplary embodiment of a magnetic recording transducer.

FIG. 4 depicts a side view of another exemplary embodiment of a magnetic recording transducer 120". For clarity, FIG. 4 is not to scale. For simplicity not all portions of the transducer 120" are shown. The magnetic recording transducer 120" is analogous to the transducer(s) 120 and/or 120'. The magnetic recording transducer 120" may be used in the magnetic disk drive 100. Thus, analogous components have similar labels. Further, as the ABS view of the transducer 120" is analogous to that of the transducer 120, only a side view is shown.

The transducer 120" includes a main pole 130" having a beveled leading surface 133 and a trailing surface including first and second portions 132 and 134. Also shown in FIG. 3 are the trailing shield 150", the nonmagnetic layer 160 and the write gap 122". The first portion 132 of the trailing surface is oriented at a first bevel angle, α1, from the stripe height direction. The first bevel angle and first portion 132 of the trailing surface are analogous to those described with respect to FIGS. 2A-2C. Similarly, the second portion 134 of the trailing surface is oriented at a second bevel angle, α2, from the stripe height direction. The bevel angles and portions 132 and 134 of the trailing surface may be configured as described above. For example, the second bevel angle is smaller than the first bevel angle (α2<α1). The size of the bevel angles and extent to which the portions 132 and 134 of the trailing surface extend from the ABS may also be analogous to those described above.

The trailing shield 150" has a first portion 152' of pole-facing surface, which faces the trailing surface of the main pole 130' and is analogous to the first portion 152/152' of pole-facing surface for shields 150 and 150'. The first portion 152 of pole-facing surface is at a trailing shield angle, β1, from the stripe height direction at the ABS that is substantially the same as the first bevel angle (β1≈α1). The trailing shield 150" also has a second portion 154' of the pole-facing surface that is recessed from the ABS and adjoins the first portion 152' of pole-facing surface. This second portion 154 of the pole-facing surface is at a second trailing shield angle, β2, from the stripe height direction. The second trailing shield angle is larger than the first bevel angle and thus larger than the second bevel angle (α2<α1<β2). The size of the trailing shield angles may also be analogous to those described above. The distance the first portion 152' of the pole-facing surface extends from the ABS is analogous to that described above. For example, the first portion 152' of the pole facing surface may extend nominally seventy-five nanometers from the ABS. Similarly, the distance the second portion 154' of the pole-facing surface extends from the ABS is analogous to that described above. For example, the second portion 154' of the pole facing surface may extend nominally one hundred and five nanometers from the ABS.

The trailing shield 150" also has a third portion 156 of the pole-facing surface that is recessed from the ABS. The second portion 154' of the pole-facing surface is between the first portion 152' of pole-facing surface and the third portion 156 of the pole-facing surface. This third portion 153 of the pole-facing surface is at a third trailing shield angle, β3, from the stripe height direction. The third trailing shield angle is larger than the second trailing shield angle (α2<α1<β2<β3). In some embodiments, the third trailing shield angle is at least forty degrees and not more than eighty degrees. In some such embodiments, the third trailing shield angle is at least fifty degrees and not more than sixty-five degrees. The third portion 156 of the pole-facing surface extends from the end of the second portion 154' of the pole-facing surface to at least one hundred nanometers and not more than one hundred fifty nanometers from the ABS. However, other distances are possible.

Between the trailing shield 150" and trailing surface (132 and 134) of the main pole 130" is the write gap 122". The widths of the write gap 122", such as d1, d2 and d3, are analogous to those described above. However, other widths are possible.

The magnetic transducer 120" may share the benefits of the transducer(s) 120/120' and disk drive 100. Because the width d1 of the gap 122" is constant near the ABS, the field produced by the magnetic transducer 120" is relatively constant between different heads. Further, the magnitude of the field may be substantially maintained. The configuration of the main pole 130" and trailing shield 150" allow for reduced shunting of the field by the trailing shield 150". As a result, performance of the transducer 120" may be improved without significant degradation of off track erasure performance. The transducer 120" may also be used in perpendicular magnetic recording as well as with other recording schemes such as shingle recording.

Figure 5:
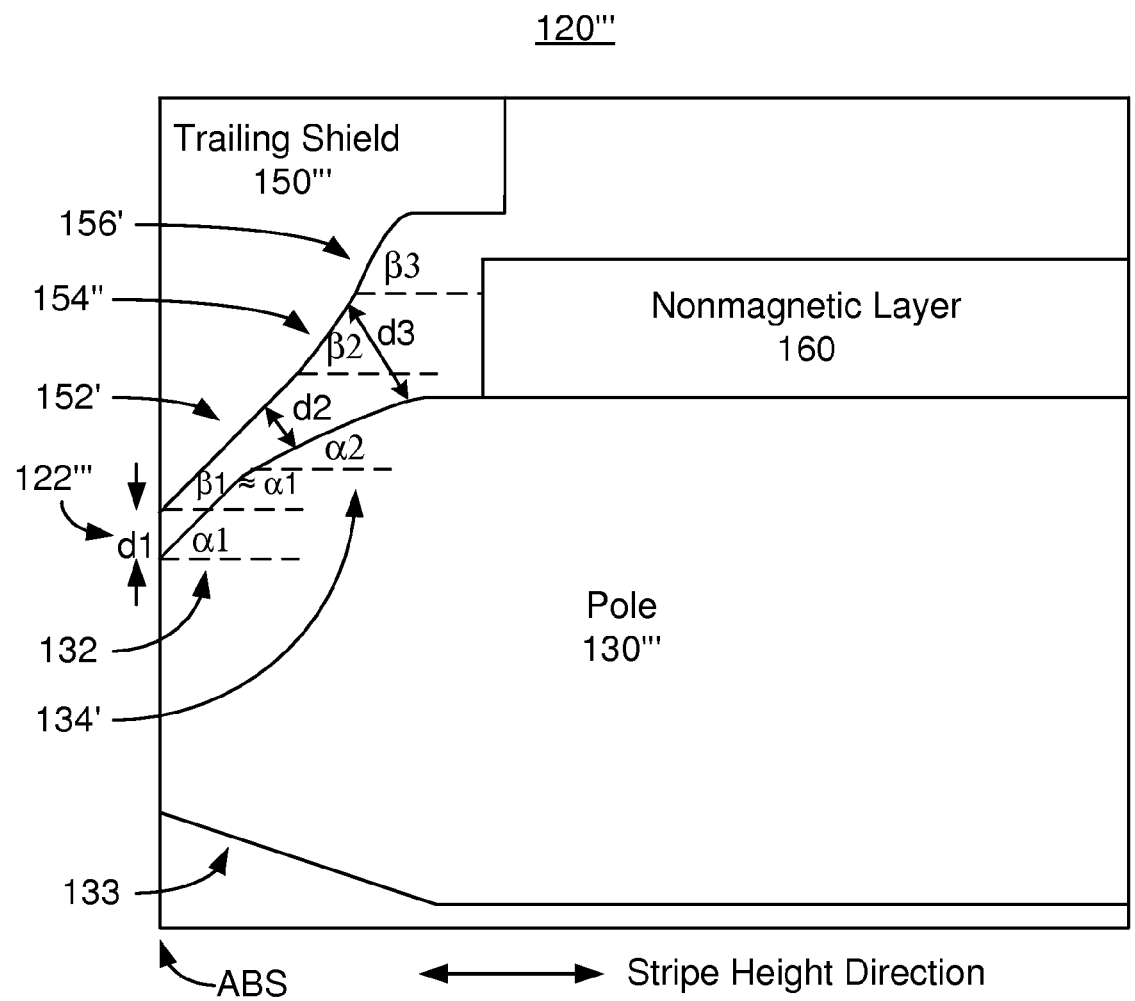
FIG. 5 depicts a side view of another exemplary embodiment of a magnetic recording transducer.

FIG. 5 depicts a side view of another exemplary embodiment of a magnetic recording transducer 120'''. For clarity, FIG. 5 is not to scale. For simplicity not all portions of the transducer 120''' are shown. The magnetic recording transducer 120''' is analogous to the transducer(s) 120, 120' and 120". The magnetic recording transducer 120''' may be used in the magnetic disk drive 100. Thus, analogous components have similar labels. Further, as the ABS view of the transducer 120''' is analogous to that of the transducer 120, only a side view is shown.

The transducer 120''' is substantially the same as the transducer 120". Thus, the magnetic recording transducer 120''' includes a write gap 122''', main pole 130''', a trailing shield 150''' and nonmagnetic layer 160 that are analogous to the write gap 122", the main pole 130", the trailing shield 150" and the nonmagnetic layer 160, respectively. However, as can be seen in FIG. 5, the second portion 134' of the trailing surface of the main pole 130" may be slightly curved and have a smoother transition from the first portion 132 of the trailing surface. Similarly, the second portion 154" and/or third portion 156' of the pole-facing surface of the trailing shield 150''' may be slightly curved and have smoother transitions from the portions 152 and 154", respectively. For example, the trailing shield 150''' may follow a concave profile (as viewed from the ABS) in the second portion 154" of the pole-facing surface. The main pole 130''' and trailing shield 150" may be closer to that which would be fabricated. The magnetic transducer 120''' may share the benefits of the transducer(s) 120/ 120'/120" and disk drive 100.

Figure 6:
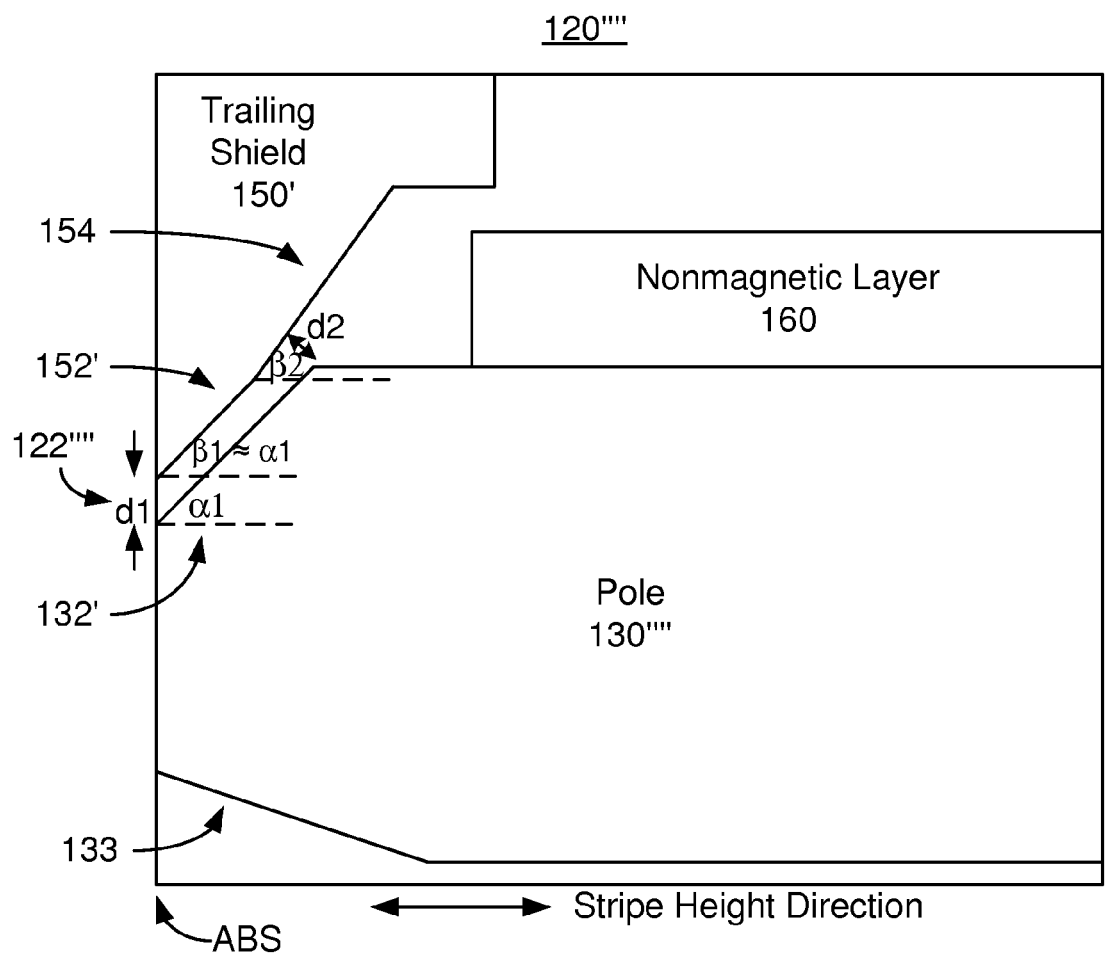
FIG. 6 depicts a side view of another exemplary embodiment of a magnetic recording transducer.

FIG. 6 depicts a side view of another exemplary embodiment of a magnetic recording transducer 120"". For clarity, FIG. 6 is not to scale. For simplicity not all portions of the transducer 120"" are shown. The magnetic recording transducer 120"" is analogous to the transducer(s) 120, 120', 120" and/or 120'''. The magnetic recording transducer 120"" may be used in the magnetic disk drive 100. Thus, analogous components have similar labels. Further, as the ABS view of the transducer 120"" is analogous to that of the transducer 120, only a side view is shown.

The transducer 120"" includes a main pole 130"" having a beveled leading surface 133 and a trailing surface including a first portion 132'. Also shown in FIG. 3 are the trailing shield 150"", the nonmagnetic layer 160 and the write gap 122"". The first portion 132' of the trailing surface is oriented at a first bevel angle, $\alpha 1$, from the stripe height direction. The first bevel angle and first portion 132' of the trailing surface are analogous to those described with respect to FIGS. 2A-2C. The size of the bevel angle may be analogous to those described above. However, the trailing surface of the main pole 130"" includes only the first portion 132'.

The trailing shield 150"" has a first portion 152' of pole-facing surface, which faces the trailing surface of the main pole 130' and is analogous to the first portion 152/152' of pole-facing surface for shields 150 and 150'. The first portion 152' of pole-facing surface is at a trailing shield angle, $\beta 1$, from the stripe height direction at the ABS that is substantially the same as the first bevel angle ($\beta 1 \approx \alpha 1$). The trailing shield 150" also has a second portion 154 of the pole-facing surface that is recessed from the ABS and adjoins the first portion 152' of pole-facing surface. This second portion 154 of the pole-facing surface is at a second trailing shield angle, $\beta 2$, from the stripe height direction. The second trailing shield angle is larger than the first bevel angle and thus larger than the second bevel angle ($\alpha 2 < \alpha 1 < \beta 2$). The size of the trailing shield angles may also be analogous to those described above. The distance the first portion 152' of the pole-facing surface extends from the ABS is analogous to that described above. For example, the first portion 152' of the pole facing surface may extend nominally seventy-five nanometers from the ABS. Similarly, the distance the second portion 154' of the pole-facing surface extends from the ABS is analogous to that described above. For example, the second portion 154' of the pole facing surface may extend nominally one hundred and five nanometers from the ABS.

Between the trailing shield 150"" and trailing surface 132' of the main pole 130"" is the write gap 122"". The widths of the write gap 122', such as d1 and d2, are analogous to those described above. However, other widths are possible.

The magnetic transducer 120"" may share the benefits of the transducer(s) 120/120'/120"/120''' and disk drive 100. Because the width d1 of the gap 122"" is constant near the ABS, the field produced by the magnetic transducer 120"" is relatively constant between different heads. Further, the magnitude of the field may be substantially maintained. The configuration of the main pole 130"" and trailing shield 150"" allow for reduced shunting of the field by the trailing shield 150"". As a result, performance of the transducer 120"" may be improved without significant degradation of off track erasure performance. The transducer 120" may also be used in perpendicular magnetic recording as well as with other recording schemes such as shingle recording.

Figure 7:
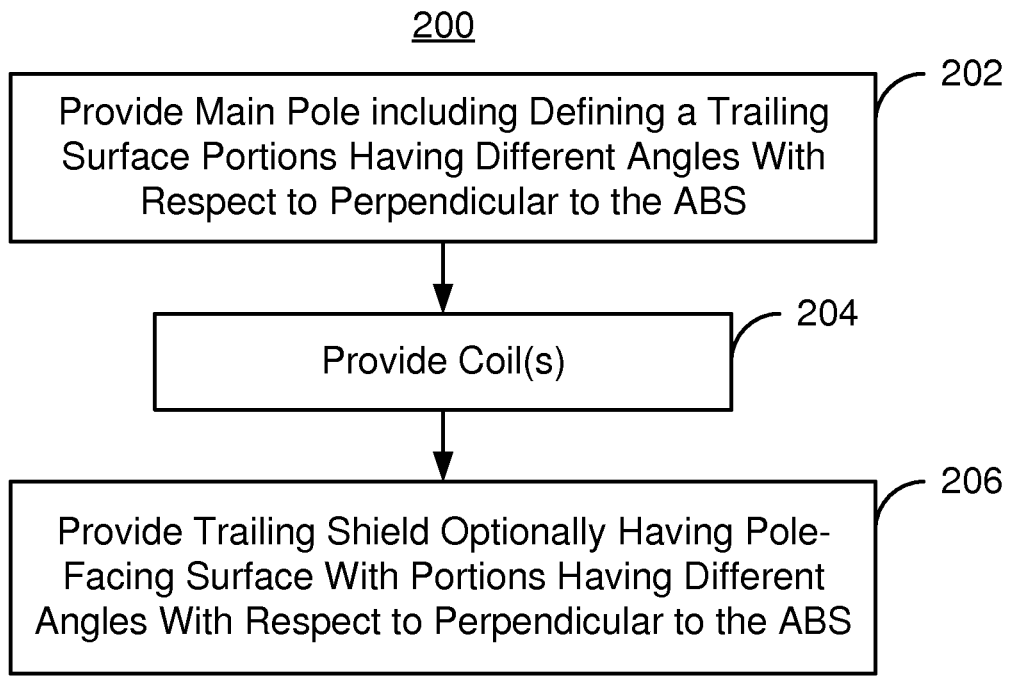
FIG. 7 depicts a flow chart of an exemplary embodiment of a method for providing magnetic recording transducer.

FIG. 7 depicts an exemplary embodiment of a method 200 for providing a magnetic recording transducer 120, 120', 120", 120''' and/or 120"". For simplicity, some steps may be omitted, interleaved, and/or combined. The method 200 is also described in the context of providing a magnetic recording head 100 and transducer 120 depicted in FIGS. 2A-2C. However, the method 200 may be used to fabricate multiple magnetic recording heads at substantially the same time. The method 200 may also be used to fabricate other magnetic recording transducers including but not limited to any combination of 120', 120", 120''', and/or 120"". The method 200 is also described in the context of particular layers. A particular layer may include multiple materials and/or multiple sub-layers. The method 200 also may start after formation of other portions of the magnetic recording head. For example, the method 200 may start after a read transducer, return pole/ shield and/or other structure have been fabricated.

Referring to FIGS. 2A-2C and 7, the main pole 130 is provided, via step 202. Step 202 may include using one or more damascene processes. For example, a trench may be formed in a layer. The trench may be fabricated such that portions of the trench sidewalls form different angles with the down track direction. The width of the trench may also vary to form pole tip and yoke regions. The trench may also be configured so that the beveled leading surface 133 is naturally formed as the trench is filled. The material(s) for the pole 130 deposited, for example via plating. One or more ferromagnetic materials may be used. The pole tip 131 and yoke 135 may be formed. In addition, the trailing surface is formed. The trailing surface may have two portions 132 and 134 as depicted in FIG. 2B. Formation of the trailing surface may include performing multiple ion beam etches. Other methods may also be used to form the pole 130 including but not limited to full film deposition of magnetic materials and removal for example via milling and/or lapping.

The coil(s) 140 are provided, via step 204. Portions of step 204 may thus be interleaved with the remaining steps of the method 200. For example, portions of the coil 140 may be provided before the formation of the main pole 130. However, other portions of the coil 140 may be provided after some or all of the main pole 130 has been formed. Step 204 may also include depositing and patterning the material(s) used for the coil(s) 140. Step 204 may include forming a single helical coil or one or more pancake/spiral coil. In such embodiments, a pancake coil 140 may include other turns far from the ABS.

The trailing shield 150 may be provided, via step 206. Step 206 may be performed such that multiple trailing shield angles, β1, β2 and/or β3, are formed.

Using the method 200, the magnetic disk drive 100 and magnetic transducers 120, 120', 120'', 120''' and/or 120'''' may be provided. Thus, the benefits of the magnetic transducers 120, 120', 120'', 120''' and/or 120'''' may be achieved.

Figure 8:
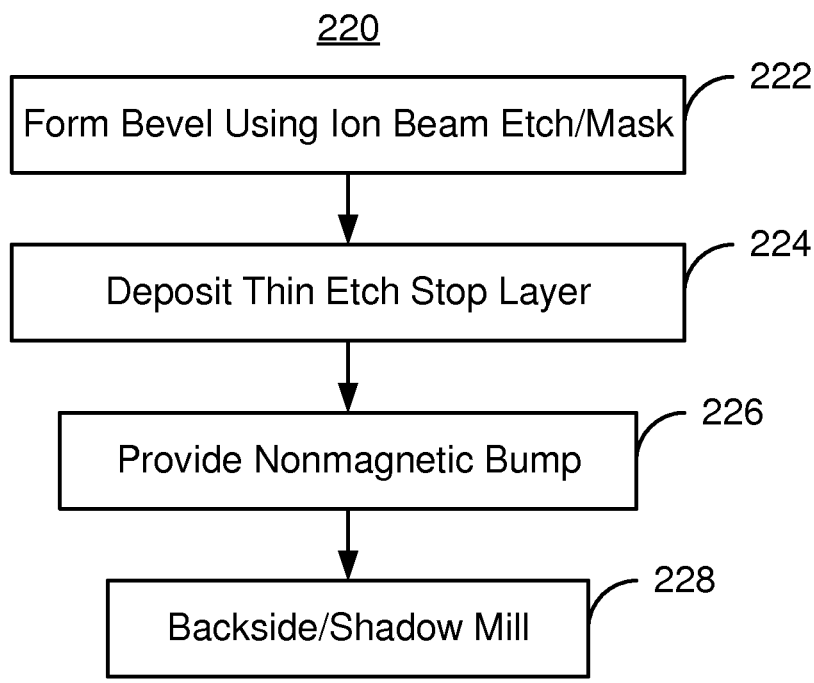
FIG. 8 depicts a flow chart of an exemplary embodiment of a method for fabricating a portion of a trailing surface of the main pole.
Figure 9:
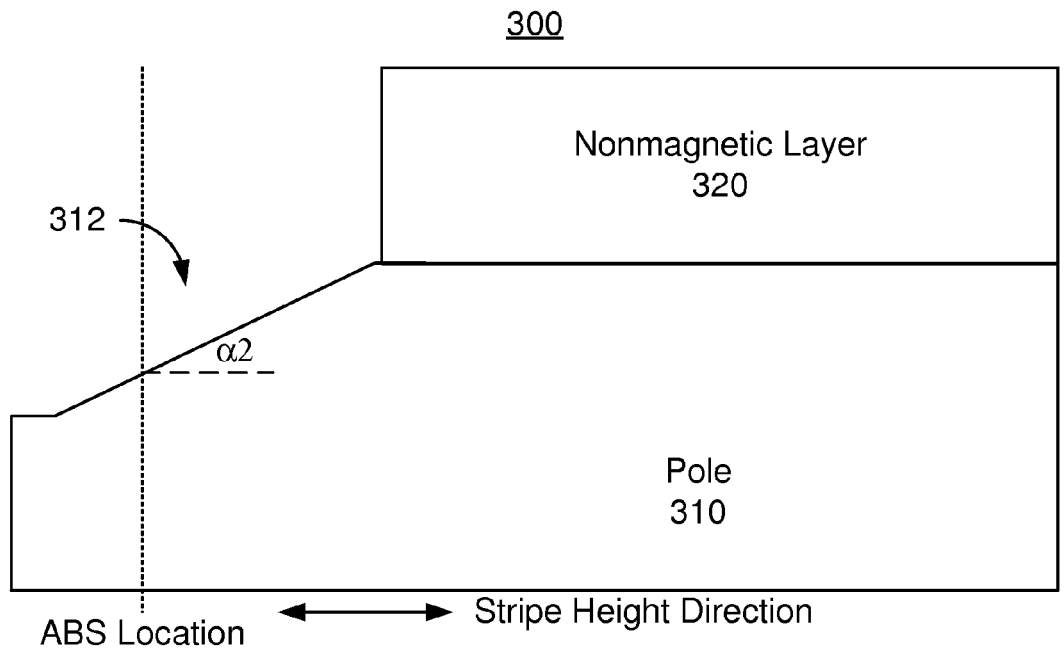
FIGS. 9-11 depict side views of another exemplary embodiment of a portion of a magnetic recording transducer during fabrication of the trailing surface.
Figure 10:
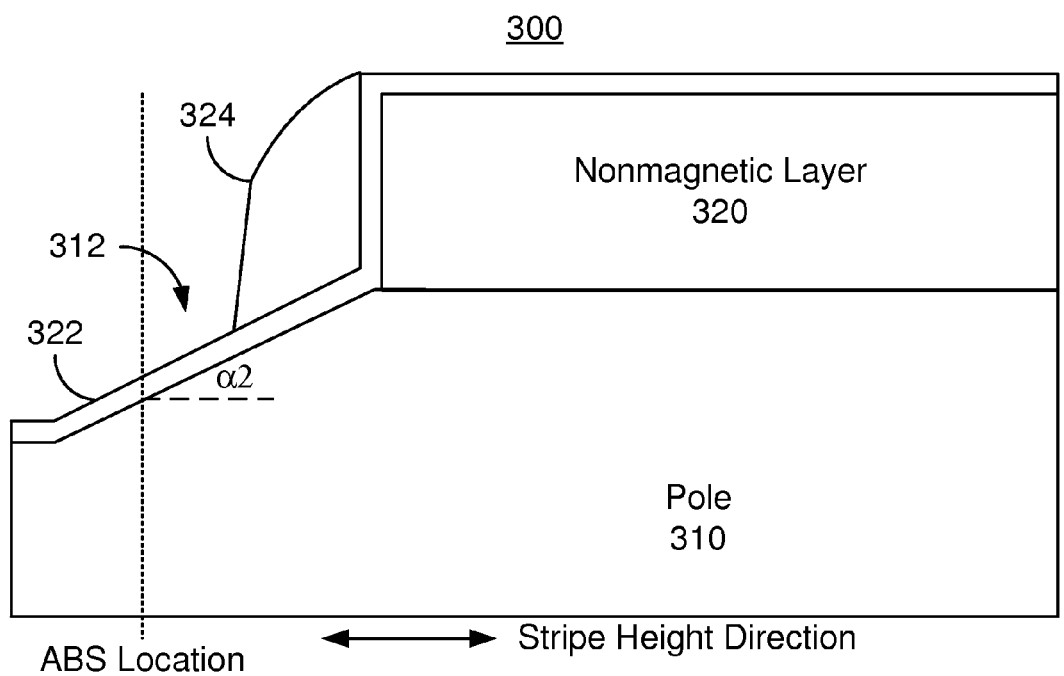
Figure 11:
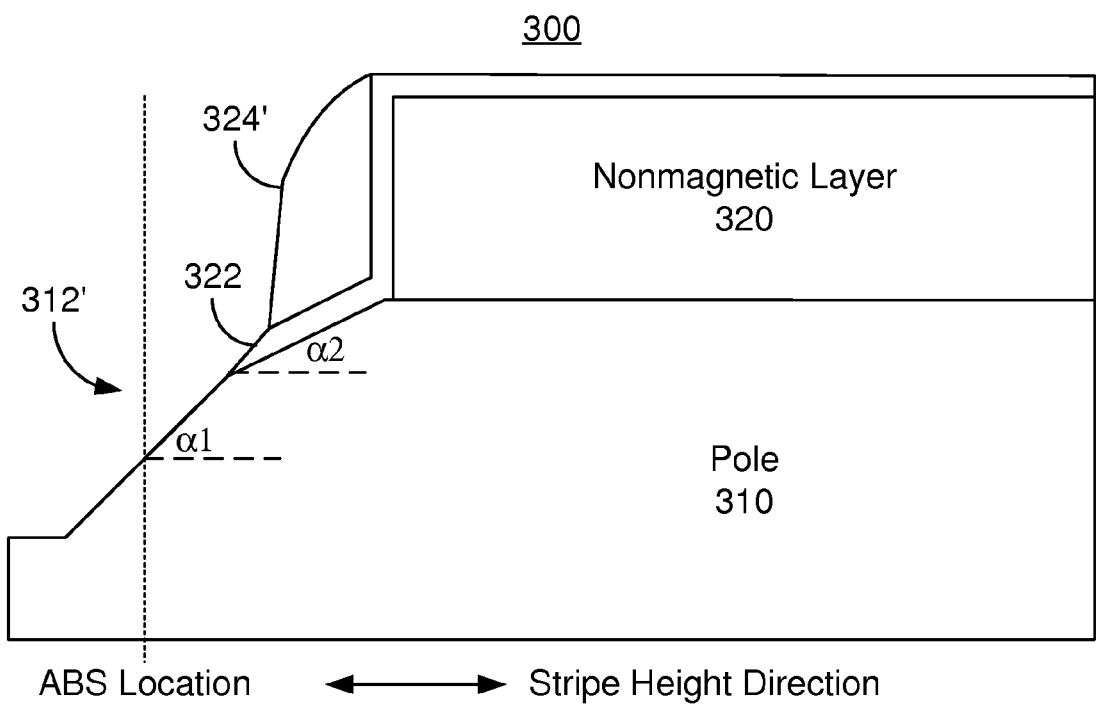

FIG. 8 depicts an exemplary embodiment of a method 220 for providing the trailing surface of the main pole. For simplicity, some steps may be omitted, interleaved, and/or combined. FIGS. 9-11 depict a portion of a magnetic recording transducer 300 during formation using the method 220. The magnetic recording transducer is analogous to the magnetic recording transducers 120, 120', 120'', 120''' and/or 120''''. Thus, the method 220 is described in the context of the transducer 300. Although described in the context of forming a single transducer 300, the method 220 may be used to fabricate multiple magnetic recording heads at substantially the same time. The method 220 is also described in the context of particular layers and structures. A particular layer and/or structure may include multiple materials and/or multiple sublayers. The method 220 also may start after formation of other portions of the magnetic recording head. For example, the method 220 may start after a read transducer, return pole/ shield and/or other structure have been fabricated and after the material(s) for the main pole have been deposited.

Referring to 8-11, the trailing surface is defined using steps 222-228. A bevel is formed in the current trailing surface of the main pole, via step 222. Step 222 may include providing an ion milling mask, and then ion beam etching the main pole to expose a first beveled surface. In some embodiments, the ion beam etch is performed using a rotation mode. The ion beam etch may be performed at an angle from normal to the surface being billed (at an angle from the ABS). The angle at which milling is performed depends upon the bevel angle desired in the final device. FIG. 9 depicts the transducer 300 after step 222 is performed. Thus, a first beveled surface 312 has been formed in the main pole 310. The nonmagnetic layer 320 may act as a mask for ion milling. The nonmagnetic layer 320 may remain in the final device. In some embodiments, the nonmagnetic layer 320 is a carbon layer. The depth (distance from the ABS) of the first beveled surface 312 is desired to be substantially the same as the depth of the second portion of the trailing surface. The angle of the first beveled surface 312 may be the second bevel angle, α2.

A thin etch stop layer is deposited, via step 224. In some embodiments, step 224 includes full film depositing a Ta/Ru bilayer. For example, nominally seven nanometers of Ta may be deposited, followed by nominally twenty-five nanometers of Ru being deposited. However, other thicknesses and/or other material(s) may be used. A nonmagnetic bump is provided, via step 226. Step 226 may be performed by depositing the nonmagnetic material(s) and then performing a reactive ion etch (RIE). The RIE removes a portion of the nonmagnetic material(s) and stops on the thin etch stop layer. For example, an aluminum oxide layer may be deposited and an aluminum oxide RIE that stops on the Ru layer may be performed. FIG. 10 depicts the transducer 300 after step 226 is performed. Thus, etch stop layer 322 has been formed and a nonmagnetic bump 324 formed.

An additional portion of the pole material(s) is removed from the first beveled surface, via step 228. Step 228 may be performed using a backside mill that uses the nonmagnetic bump as a mask. The ion beam etch may be performed at an angle from the ABS. The angle at which milling is performed depends upon the bevel angle(s) desired in the final device. FIG. 11 depicts the transducer 300 after step 228 is performed. Thus, trailing surface 312' has been formed. Further, the bevel angle, α1, at the ABS location is the same as the first bevel angle. The angle α2 is the second bevel angle. The trailing surface 312' having first and second portions and corresponding first and second bevel angles has been provided.

Using the method 220, the main pole 310/130/130'/130''/ 130'''/130'''', may be provided. Thus, the benefits of the magnetic transducers 120, 120', 120'', 120''', 120'''' and/or 300 may be achieved.

We claim:

1. A magnetic transducer having air-bearing surface (ABS) comprising:
   a main pole including a leading surface and a trailing surface opposite to the leading surface, the trailing surface having a first portion and a second portion, the first portion of the trailing surface adjoining the ABS being oriented at a first bevel angle from a direction perpendicular to the ABS, the first bevel angle being greater than zero and less than ninety degrees, the second portion of the trailing surface adjoining the first portion and being recessed from the ABS, the second portion being oriented at a second bevel angle from the direction perpendicular to the ABS, the second bevel angle being less than the first bevel angle and greater than zero degrees;
   a trailing shield having a pole-facing surface, the pole-facing surface being opposite to the trailing surface, a first portion of the pole-facing surface adjoining the ABS being oriented at a first trailing shield angle from the direction perpendicular to the ABS, the first trailing shield angle being substantially the same as the first bevel angle;
   a write gap between the trailing shield and the main pole, the trailing surface of main pole and the pole-facing surface of the trailing shield being configured such that the write gap has a constant thickness for the first portion of the trailing surface and a variable thickness for the second portion of the trailing surface, the variable thickness increasing with increasing distance from the ABS;

at least one coil for energizing the main pole; and wherein the pole-facing surface further includes a second portion recessed from the ABS and adjoining the first portion of the pole-facing surface, the second portion of the pole-facing surface being oriented at a second trailing shield angle from the direction perpendicular to the ABS, the second trailing shield angle being greater than the first trailing shield angle such that the write gap increases with increasing distance from the ABS.

2. The magnetic transducer of claim 1 wherein the first bevel angle is at least fifteen degrees and not more than forty degrees and wherein the second bevel angle is a least ten degrees and not more than thirty-five degrees.

3. The magnetic transducer of claim 1 wherein the first bevel angle is at least twenty-five degrees and not more than thirty-three degrees and wherein the second bevel angle is a least twenty degrees and not more than thirty degrees.

4. The magnetic transducer of claim 1 wherein the first portion of the trailing surface extends not more than one hundred fifty nanometers from the ABS.

5. The magnetic transducer of claim 4 wherein the first portion of the trailing surface extends at least one forty nanometers and not more than eighty nanometers from the ABS.

6. The magnetic transducer of claim 1 wherein the second portion of the trailing surface extends at least one hundred nanometers and not more than two hundred fifty nanometers from the ABS.

7. The magnetic transducer of claim 6 wherein the second portion of the trailing surface extends not more than one hundred fifty nanometers from the ABS.

8. The magnetic transducer of claim 1 wherein the second trailing shield angle is at least twenty degrees and not more than fifty degrees.

9. The magnetic transducer of claim 8 wherein the second trailing shield angle is at least thirty-five degrees and not more than forty-five degrees.

10. The magnetic transducer of claim 1 wherein the pole-facing surface of the trailing shield includes a third portion having a third trailing shield angle from the direction perpendicular to the ABS, the second portion of the pole-facing surface is between the first portion of the pole-facing surface and the third portion of the pole-facing surface, the second trailing shield angle being greater than the first trailing shield angle and less than the third trailing shield angle.

11. The magnetic transducer of claim 10 wherein the third portion of the pole-facing surface of the trailing shield occurs at least one hundred nanometers and not more than one hundred fifty nanometers from the ABS.

12. The magnetic transducer of claim 10 wherein the third trailing shield angle is at least forty degrees and not more than eighty degrees.

13. The magnetic transducer of claim 12 wherein the third trailing shield angle is at least fifty degrees and not more than sixty-five degrees.

14. The magnetic transducer of claim 1 wherein the write gap is at least ten nanometers and not more than thirty-five nanometers between the first portion of the pole-facing surface and the first portion of the trailing surface.

15. The magnetic transducer of claim 14 wherein the write gap is at least eighteen nanometers and not more than thirty nanometers between the first portion of the pole-facing surface and the first portion of the trailing surface.

16. The magnetic transducer of claim 14 wherein the write gap is at least ten nanometers and not more than sixty nanometers between the second portion of the trailing surface and the trailing shield.

17. A disk drive comprising:

a media, a slider, and a magnetic transducer coupled with the slider, the magnetic transducer having air-bearing surface (ABS), a main pole, a trailing shield, a write gap and at least one coil for energizing the main pole, the main pole including a leading surface and a trailing surface opposite to the leading surface, the trailing surface having a first portion and a second portion, the first portion of the trailing surface adjoining the ABS being oriented at a first bevel angle from a direction perpendicular to the ABS, the first bevel angle being greater than zero and less than ninety degrees, the second portion of the trailing surface adjoining the first portion and being recessed from the ABS, the second portion being oriented at a second bevel angle from the direction perpendicular to the ABS, the second bevel angle being less than the first bevel angle and greater than zero degrees, the trailing shield having a pole-facing surface, the pole-facing surface being opposite to the trailing surface, a first portion of the pole-facing surface adjoining the ABS being oriented at a first trailing shield angle from the direction perpendicular to the ABS, the first trailing shield angle being substantially the same as the first bevel angle, the write gap being between the trailing shield and the main pole, the trailing surface of main pole and the pole-facing surface of the trailing shield being configured such that the write gap has a constant thickness for the first portion of the trailing surface and a variable thickness for the second portion of the trailing surface, the variable thickness increasing with increasing distance from the ABS; and wherein the pole-facing surface further includes a second portion recessed from the ABS and adjoining the first portion of the pole-facing surface, the second portion of the pole-facing surface being oriented at a second trailing shield angle from the direction perpendicular to the ABS, the second trailing shield angle being greater than the first trailing shield angle such that the write gap increases with increasing distance from the ABS.

18. A method for providing a magnetic transducer having air-bearing surface (ABS) comprising:

providing a main pole including a leading surface and a trailing surface opposite to the leading surface, the trailing surface having a first portion and a second portion, the first portion of the trailing surface adjoining the ABS being oriented at a first bevel angle from a direction perpendicular to the ABS, the first bevel angle being greater than zero and less than ninety degrees, the second portion of the trailing surface adjoining the first portion and being recessed from the ABS, the second portion being oriented at a second bevel angle from the direction perpendicular to the ABS, the second bevel angle being less than the first bevel angle and greater than zero degrees;

providing a trailing shield having a pole-facing surface, the pole-facing surface being opposite to the trailing surface, a first portion of the pole-facing surface adjoining the ABS being oriented at a first trailing shield angle from the direction perpendicular to the ABS, the first trailing shield angle being substantially the same as the first bevel angle;

providing a write gap between the trailing shield and the main pole, the trailing surface of main pole and the pole-facing surface of the trailing shield being configured such that the write gap has a constant thickness for the first portion of the trailing surface and a variable thickness for the second portion of the trailing surface, the variable thickness increasing with increasing distance from the ABS;

providing at least one coil for energizing the main pole; and wherein the pole-facing surface further includes a second portion recessed from the ABS and adjoining the first portion of the pole-facing surface, the second portion of the pole-facing surface being oriented at a second trailing shield angle from the direction perpendicular to the ABS, the second trailing shield angle being greater than the first trailing shield angle such that the write gap increases with increasing distance from the ABS.

19. The method of claim 18 wherein the step of providing the main pole further includes:

defining the trailing surface, the step of defining the trailing surface further including:

removing a portion of the main pole to form a first surface having the second bevel angle, the first surface including the second portion of the trailing surface;

depositing an etch stop layer on at least the first surface;

depositing a nonmagnetic layer on the etch stop layer;

removing a portion of the nonmagnetic layer to form a nonmagnetic bump on the second portion of the trailing surface; and removing an additional portion of the main pole and a portion of the etch stop layer, thereby forming the first portion of the trailing surface.

20. The method of claim 19 wherein the step of removing the portion of the main pole further includes:

providing a carbon hard mask recessed from the ABS; and ion beam etching the main pole.

21. The method of claim 20 wherein the step of removing the additional portion of the main pole further includes:

ion milling the additional portion of the main pole and the portion of the etch stop layer.

\* \* \* \* \*